US 8,276,134 B2

(12) United States Patent
Grcevski et al.

(10) Patent No.: US 8,276,134 B2
(45) Date of Patent: *Sep. 25, 2012

(54) TRANSFORMING LOCKS IN SOFTWARE LOOPS

(75) Inventors: Nikola Grcevski, Toronto (CA); Kevin Alexander Stoodley, Richmond Hill (CA); Mark Graham Stoodley, North York (CA); Vijay Sundaresan, North York (CA)

(73) Assignee: International Business Machines Corporation, Armonk, NY (US)

( * ) Notice: Subject to any disclaimer, the term of this patent is extended or adjusted under 35 U.S.C. 154(b) by 1072 days.

This patent is subject to a terminal disclaimer.

(21) Appl. No.: 12/135,311

(22) Filed: Jun. 9, 2008

(65) Prior Publication Data

US 2008/0250396 A1 Oct. 9, 2008

Related U.S. Application Data

(63) Continuation of application No. 10/845,542, filed on May 13, 2004, now Pat. No. 7,404,183.

(30) Foreign Application Priority Data

Sep. 26, 2003 (CA) ..................................... 2442800

(51) Int. Cl.
*G06F 9/45* (2006.01)
(52) U.S. Cl. ......... 717/160; 717/151; 717/159; 707/704
(58) Field of Classification Search .................. None
See application file for complete search history.

(56) References Cited

U.S. PATENT DOCUMENTS

| 5,414,839 A | 5/1995 | Joshi |
| 5,430,860 A | 7/1995 | Capps, Jr. et al. |
| 5,524,247 A | 6/1996 | Mizuno |
| 5,966,543 A | 10/1999 | Hartner et al. |
| 6,128,713 A | 10/2000 | Eisler et al. |
| 6,144,983 A | 11/2000 | Klots et al. |
| 6,173,442 B1 | 1/2001 | Agesen et al. |
| 6,247,025 B1 | 6/2001 | Bacon |
| 6,314,563 B1 | 11/2001 | Agesen et al. |
| 6,418,517 B1 | 7/2002 | McKenney et al. |
| 6,530,079 B1 | 3/2003 | Choi et al. |

OTHER PUBLICATIONS

Siegell et al., "Controlling Application Grain Size on a Network of Workstations", 1995, Proceedings of the 1995 ACM/IEEE Conference on Supercomputing.*

(Continued)

*Primary Examiner* — Lewis A Bullock, Jr.
*Assistant Examiner* — Jue Wang
(74) *Attorney, Agent, or Firm* — John D. Flynn; Gregory K Goshorn; Greg Goshorn, P.C.

(57) ABSTRACT

An improved system and computer programming product for acquisition and release of locks within a software program is disclosed. In an exemplary embodiment, a lock within a loop is transformed by relocating acquisition and release instructions from within the loop to positions outside the loop. This may significantly decrease unnecessarily lock acquisition and release during execution of the software program. In order to avoid contention problems which may arise from acquiring and keeping a lock on an object over a relatively long period of time, a contention test may be inserted into the loop. Such a contention test may temporarily release the lock if another thread in the software program requires access to the locked object.

14 Claims, 9 Drawing Sheets

OTHER PUBLICATIONS

Dinz et al., "Eliminating Synchronization Overhead in Automatically Parallelized Programs Using Dynamic Feedback", May 1999, ACM Transaction on Computer Systems, Volumn 17, No. 2, pp. 89-132.*

Siegell et al.; "Controlling Application Grain Size on a Network of Workstations"; 1995, Proceedings of the 1995 ACM/IEEE Conference on Supercomputing.

Diniz et al.; "Eliminating Synchronization Overhead in Automatically Parallelized Programs Using Dynamic Feedback"; May 1999; ACM Transaction ofn Computer Systems, V. 17, No. 2, pp. 89-132.

* cited by examiner

```
301  void method_with_loop() {
302      for (i=0;i < N;i++) {
303          if (condition) {
304              UnlockedCodeBefore();
305              lock(L);
306              LockedCode();
307              unlock(L);
308              UnlockedCodeAfter();
309          }
310          else {
311              UnlockedCodeElse();
312          }
313      }
314  }
```

FIG. 3

```
401  void method_with_loop() {
402      if (L != NULL)
403          lock(L);
404      for (i=0;i < N;i++) {
405          if (condition) {
406              UnlockedCodeBefore();
407              LockedCode();
408              UnlockedCodeAfter();
409          }
410          else {
411              UnlockedCodeElse();
412          }
413      }
414      if (L != NULL)
415          unlock(L);
416  }
```

FIG. 4

```
501  void method_with_loop() {
502      if (L != NULL)
503          lock(L);
504      for (i=0;i < N;i++) {
505          if (condition) {
506              UnlockedCodeBefore();
507              if (CONTENDED(L)) {
508                  unlock(L);
509                  lock(L);
510              }
511              LockedCode();
512              UnlockedCodeAfter();
513          }
514          else {
515              UnlockedCodeElse();
516              if (L != NULL && CONTENDED(L)) {
517                  unlock(L);
518                  lock(L);
519              }
520          }
521      }
522      if (L != NULL)
523          unlock(L);
524  }
```

```
601  void method_with_loop() {
602      int S=<constant>;
603      if (L != NULL)
604          lock(L);
605      for (i=0;i < N;i+=S) {
606          int strip_length=min(N-i,S);
607          for (j=0;j < strip_length;j++) {
608              if (condition) {
609                  UnlockedCodeBefore();
610                  LockedCode();
611                  UnlockedCodeAfter();
612              }
613              else {
614                  UnlockedElse();
615              }
616          }
617          if (L != NULL && CONTENDED(L)) {
618              unlock(L);
619              lock(L);
620          }
621      }
622      if (L != NULL)
623          unlock(L);
624  }
```

FIG. 6

```
701  void method_with_loop() {
702      static int method_with_loop_S=<constant value>;
703      int S=method_with_loop_S;
704      if (L != null)
705          lock(L);
706      for (i=0;i < N;i+=S) {
707          int strip_length=min(N-i,S);
708          for (j=0;j < strip_length;j++) {
709              if (condition) {
710                  UnlockedCodeBefore();
711                  LockedCode();
712                  UnlockedCodeAfter();
713              }
714              else {
715                  UnlockedCodeElse();
716              }
717          }
718          if (L != NULL && CONTENDED(L)) {
719              unlock(L);
720              lock(L);
721              SHRINK(S);
722          }
723          GROW(S);
724      }
725      if (L != null)
726          unlock(L);
727      method_with_loop_S = S;
728  }
```

FIG. 7A  ↙ 700A

```
730  SHRINK(S)  { S--; }
731  SHRINK(S)  { S = 1; }
732  SHRINK(S)  { S >>= 1; if (S < 1) S = 1; }

740  GROW(S)    { S++; }
741  GROW(S)    { S <<= 1; if (S > N) S = N; }
```

FIG. 7B  ↙ 700B

```
801  void method_with_loop() {
802      for (i=0;i < N;i++) {
803          if (condition) {
804              UnlockedCodeBefore();
805              lock(L1);
806              LockedL1CodeFirst();
807              lock(L2);
808              LockedL1AndL2Code();
809              unlock(L2);
810              LockedL1CodeSecond();
811              unlock(L1);
812              UnlockedCodeAfter();
813          }
814          else {
815              UnlockedCodeElse();
816          }
817      }
818  }
```

FIG. 8  ⬉—800

```
901  void method_with_loop() {
902      if(L1 != NULL)
903          lock(L1);
904      for (i=0;i < N;i++) {
905          if (condition) {
906              UnlockedCodeBefore();
907              if (CONTENDED(L1)) {
908                  unlock(L1);
909                  lock(L1);
910              }
911              LockedL1CodeFirst();
912              lock(L2);
913              LockedL1AndL2Code();
914              unlock(L2);
915              LockedL1CodeSecond();
916              UnlockedCodeAfter();
917          }
918          else {
919              UnlockedCodeElse();
920              if (L1 != NULL && CONTENDED(L1)) {
921                  unlock(L1);
922                  lock(L1);
923              }
924          }
925      }
926      if (L1 != NULL)
927          unlock(L1);
928  }
```

FIG. 9  ⬉—900

```
1001  void method_with_loop() {
1002      if(L1 != NULL)
1003          lock(L1);
1004      if (L2 != NULL)
1005          lock(L2);
1006      for (i=0;i < N;i++) {
1007          if (condition) {
1008              UnlockedCodeBefore();
1009              if (CONTENDED(L1)) {
1010                  unlock(L2);
1011                  unlock(L1);
1012                  lock(L1);
1013                  lock(L2);
1014              }
1015              LockedL1CodeFirst();
1016              if (CONTENDED(L2)) {
1017                  unlock(L2);
1018                  lock(L2);
1019              }
1020              LockedL1AndL2Code();
1021              unlock(L2);
1022              LockedL1CodeSecond();
1023              UnlockedCodeAfter();
1024          }
1025          else {
1026              UnlockedCodeElse();
1027              if (L1 != NULL && CONTENDED(L1)) {
1028                  unlock(L2);
1029                  unlock(L1);
1030                  lock(L1);
1031                  lock(L2);
1032              } else if (L2!=NULL && CONTENDED(L2)) {
1033                  unlock(L2);
1034                  lock(L2);
1035              }
1036          }
1037      }
1038      if (L1 != NULL)
1039          unlock(L1);
1040  }
```

FIG. 10

```
1100  void method_with_loop() {
1101      for (i=0;i < N;i++) {
1102          if (condition) {
1103              UnlockedCodeBefore();
1104              lock(L1);
1105              LockedCode();
1106              unlock(L1);
1107              UnlockedCodeAfter();
1108          }
1109          else {
1110              UnlockedCodeBefore();
1111              lock(L2);
1112              LockedCode();
1113              unlock(L2);
1114              UnlockedCodeAfter();
1115          }
1116      }
1117  }
```

FIG. 11  ~1100

```
1201  void method_with_loop() {
1202      if(L2 != NULL)
1203          lock(L2);
1204      for (i=0;i < N;i++) {
1205          if (condition) {
1206              UnlockedCodeBefore();
1207              if(L2 != NULL)
1208                  unlock(L2);
1209              lock(L1);
1210              LockedCode();
1211              unlock(L1);
1212              if(L2 != NULL)
1213                  lock(L2);
1214              UnlockedCodeAfter();
1215          }
1216          else {
1217              UnlockedCodeBefore();
1218              if (CONTENDED(L2)) {
1219                  unlock(L2);
1220                  lock(L2);
1221              }
1222              LockedCode();
1223              UnlockedCodeAfter();
1224          }
1225      }
1226      if (L2 != NULL)
1227          unlock(L2);
1228  }
```

FIG. 12  ~1200

TRANSFORMING LOCKS IN SOFTWARE LOOPS

CROSS-REFERENCE TO RELATED APPLICATIONS

The present application is a continuation and claims the benefit of the filing date of an application entitled, "Transforming Locks in Software Loops" Ser. No. 10/845,542, filed May, 13, 2004, now U.S. Pat. No. 7,404,183, assigned to the assignee of the present application, and herein incorporated by reference.

COPYRIGHT NOTICE AND PERMISSION

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

1. Technical Field

The claimed subject matter relates generally to computer systems and software programs, and more specifically to locks in software loops.

2. Description of the Related Art

In some software programs, it is necessary to acquire a lock on an object in order to perform certain operations that are dependent on the object being in a locked state. Subsequent to performing the operation(s), the lock is released. In some cases, such a lock is found within a software loop, and so lock acquisition on, and release of, an object may occur repeatedly, with each iteration of the loop. While placing the lock in the loop may be convenient and safe, repeated and unnecessary lock acquisition and release may significantly degrade the performance of the software program.

An improved method and system for acquiring and releasing locks within a software program is therefore desirable.

SUMMARY OF THE CLAIMED SUBJECT MATTER

The present invention provides an improved method and system for acquisition and release of locks within a software program. In an exemplary embodiment, a lock within a software loop is transformed by relocating acquisition and release instructions from within the loop to positions outside the loop. In the present discussion, this process is sometimes referred to as a "lock coarsening transformation". This transformation may significantly decrease unnecessary lock acquisition and release during execution of the software program. In order to avoid contention problems which may arise from acquiring and keeping a lock on an object over a relatively long period of time, a contention test may be inserted into the loop. Such a contention test may temporarily release the lock if another thread in the software program requires access to the locked object.

In an embodiment, in addition to the coarsening transformation, a loop may be transformed into a "strip-mine" configuration. Typically, a strip-mine configuration includes an inner loop and an outer loop, and the inner loop may be executed in "strip-lengths" of "S" iterations. The outer loop may now contain the lock acquisition and release instructions, which may also be executed every S iterations.

In an embodiment, the value of S may be dynamically adjusted based oil the level of contention seen at the contention test.

In an aspect of the invention, there is provided a method of transforming a lock on an object in a loop of a computer program, said lock having a pair of lock and unlock operations applicable on said object at original points within said loop, said method comprising:
(i) moving said lock and unlock operations from said original points inside said loop to points outside said loop;
(ii) inserting a contention test within said loop such that said lock may be temporarily unlocked if access to said object is required by another thread during execution of said loop.

In an embodiment, in (ii), said contention test is inserted at the original point of said lock operation.

In an embodiment, said loop has N iterations, and said method further comprises:
(iii) transforming said loop into an inner loop and an outer loop, said inner loop having a strip length S and said outer loop having its number of iterations dependant upon S, said contention test in (ii) being provided outside said inner loop but inside said outer loop.

In an embodiment, said method further comprises:
(iv) dynamically adjusting S in dependence upon each result of said contention test during execution of iterations of said outer loop.

In an embodiment, (iv) comprises incrementally shrinking S where said contention test indicates contention.

In an embodiment, (iv) comprises incrementally growing S where said contention test indicates lack of contention.

In an embodiment, (iv) comprises resetting S to a predetermined minimum value where said contention test indicates contention.

In an embodiment, (iv) comprises growing S by a multiplicative value, to a maximum value of N, where said contention test indicates lack of contention.

In an embodiment, in (ii) said contention test is provided in each branch of a loop, such that said contention test is performed regardless of the branch of the loop accessed.

In another aspect of the invention, there is provided a system for transforming a lock on an object in a loop of a computer program, said lock having a pair of lock and unlock operations applicable on said object at original points within said loop, comprising:
(a) means for moving said lock and unlock operations from said original points inside said loop to points outside said loop;
(b) means for inserting a contention test within said loop such that said lock may be temporarily unlocked if access to said object is required by another thread during execution of said loop.

In an embodiment, in (b), said contention test is placed at the original point of said lock operation.

In an embodiment, said loop has N iterations, and said system further comprises:
(c) means for transforming said loop into an inner loop and an outer loop, said inner loop having a strip length size S and said outer loop having its number of iterations dependent upon S, said contention test in (b) being provided outside said inner loop but inside said outer loop.

In an embodiment, said system further comprises:
(d) means for dynamically adjusting S in dependence upon each result of said contention test during execution of iterations of said outer loop.

In an embodiment, (d) comprises means for incrementally shrinking S where said contention test indicates contention.

In an embodiment, (d) comprises means for incrementally growing S where said contention test indicates lack of contention.

In an embodiment, (d) comprises means for resetting S to a predetermined minimum value where said contention test indicates contention.

In an embodiment, (d) comprises means growing S by a multiplicative value, to a maximum value of N, where said contention test indicates lack of contention.

In an embodiment, in (b) said contention test is provided in each branch of a loop, such that said contention test is performed regardless of the branch of the loop accessed.

In another aspect of the invention, there is provided a system comprising a processor and computer readable memory, said memory storing code for transforming a lock on an object in a loop of a computer program, said lock having a pair of lock and unlock operations applicable on said object at original points within said loop, said code adapting said system to:

move said lock and unlock operations from said original points inside said loop to points outside said loop;
insert a contention test within said loop such that said lock may be temporarily unlocked if access to said object is required during execution of said loop.

In another aspect of the invention, there is provided a computer readable medium having computer readable program code embedded in the medium for transforming a lock on an object in a loop of a computer program, said lock having a pair of lock and unlock operations applicable on said object at original points within said loop, the computer readable program code including:

(a) code for moving said lock and unlock operations from said original points inside said loop to points outside said loop;
(b) code for inserting a contention test within said loop such that said lock is configured to be temporarily unlocked if access to said object is required by another thread during execution of said loop.

In an embodiment, in (b), said code is configured to insert said contention test at the original point of said lock operation.

In an embodiment, said loop has N iterations, and said computer readable program code further comprises:

(c) code for transforming said loop into an inner loop and an outer loop, said inner loop having a strip length S and said outer loop having its number of iterations dependant upon S, said contention test in (b) being provided outside said inner loop but inside said outer loop.

In an embodiment, said computer readable program code further comprises:

(d) code for dynamically adjusting S in dependence upon each result of said contention test during execution of iterations of said outer loop.

In an embodiment, (d) comprises code for incrementally shrinking S where said contention test indicates contention.

In an embodiment, (d) comprises code for incrementally growing S where said contention test indicates lack of contention.

In an embodiment, (d) comprises code for resetting S to a predetermined minimum value where said contention test indicates contention.

In an embodiment, (d) comprises code for growing S by a multiplicative value, to a maximum value of N, where said contention test indicates lack of contention.

In an embodiment, in (b) said code is configured to provide a contention test in each branch of a loop, such that said contention test is performed regardless of the branch of the loop accessed.

The forgoing and other aspects of the invention will be apparent from the following more particular descriptions of exemplary embodiments of the invention.

BRIEF DESCRIPTION OF THE FIGURES

In the figures which illustrate exemplary embodiments of the invention:

FIG. 3 is an illustrative example of code containing a lock within a software loop.

FIG. 4 is the code of FIG. 3 in which the lock has undergone a lock coarsening transformation.

FIG. 6 is the code of FIG. 5, which has been transformed into a strip-mining configuration.

FIG. 7a is the code of FIG. 6 further including code for dynamically adjusting the strip-length S.

FIG. 7b shows illustrative alternatives for shrinking and growing the strip-length S in the code of FIG. 7a.

FIG. 8 is an illustrative example of code including first and second locks within a software loop.

FIG. 9 is the code of FIG. 8 partially transformed to coarsen the first lock of the code in FIG. 8.

FIG. 10 is the code of FIG. 9 further transformed to handle lock acquisition and release for both first and second locks.

FIG. 11 is an illustrative example of code in which all paths inside a loop acquire at most one lock.

FIG. 12 is the code of FIG. 11 transformed to coarsen the lock in the most active path.

DETAILED DESCRIPTION OF THE FIGURES

Figure 1:
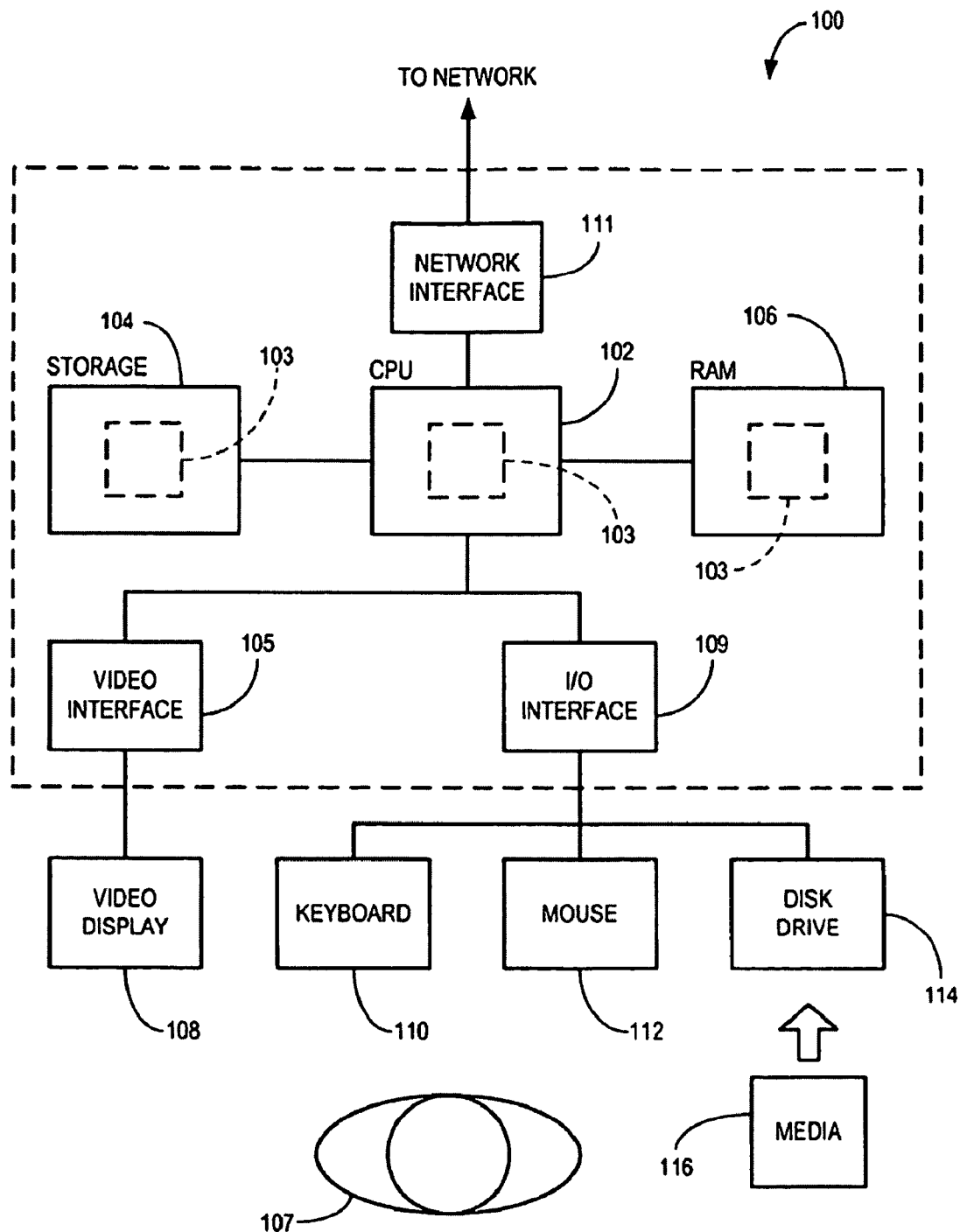
FIG. 1 is a schematic block diagram of a generic computer system which may provide an operating environment for exemplary embodiments of the invention.

Referring to FIG. 1, shown is an exemplary computer system 100 that may provide an operating environment for exemplary embodiments of the invention. The computer system 100 may include a processor or central processing unit ("CPU") 102 connected to a storage unit 104 and to a computer readable random access memory ("RAM") 106. The CPU 102 may execute a software program 103 which may be stored in the storage unit 104 and loaded into RAM 106 as required. A user 107 may interact with the computer system 100 using a video display 108 connected by a video interface 105, and various input/output devices such as a keyboard 110, mouse 112, and disk drive 114 connected by an I/O interface 109. The disk drive 114 may be configured to accept computer readable media 116. Optionally, the computer system 100 may be network enabled via a network interface 111. It will be appreciated that the computer system 100 of FIG. 1 is merely illustrative and is not meant to be limiting in terms of the type of system that might provide a suitable operating environment for the invention.

Figure 2:
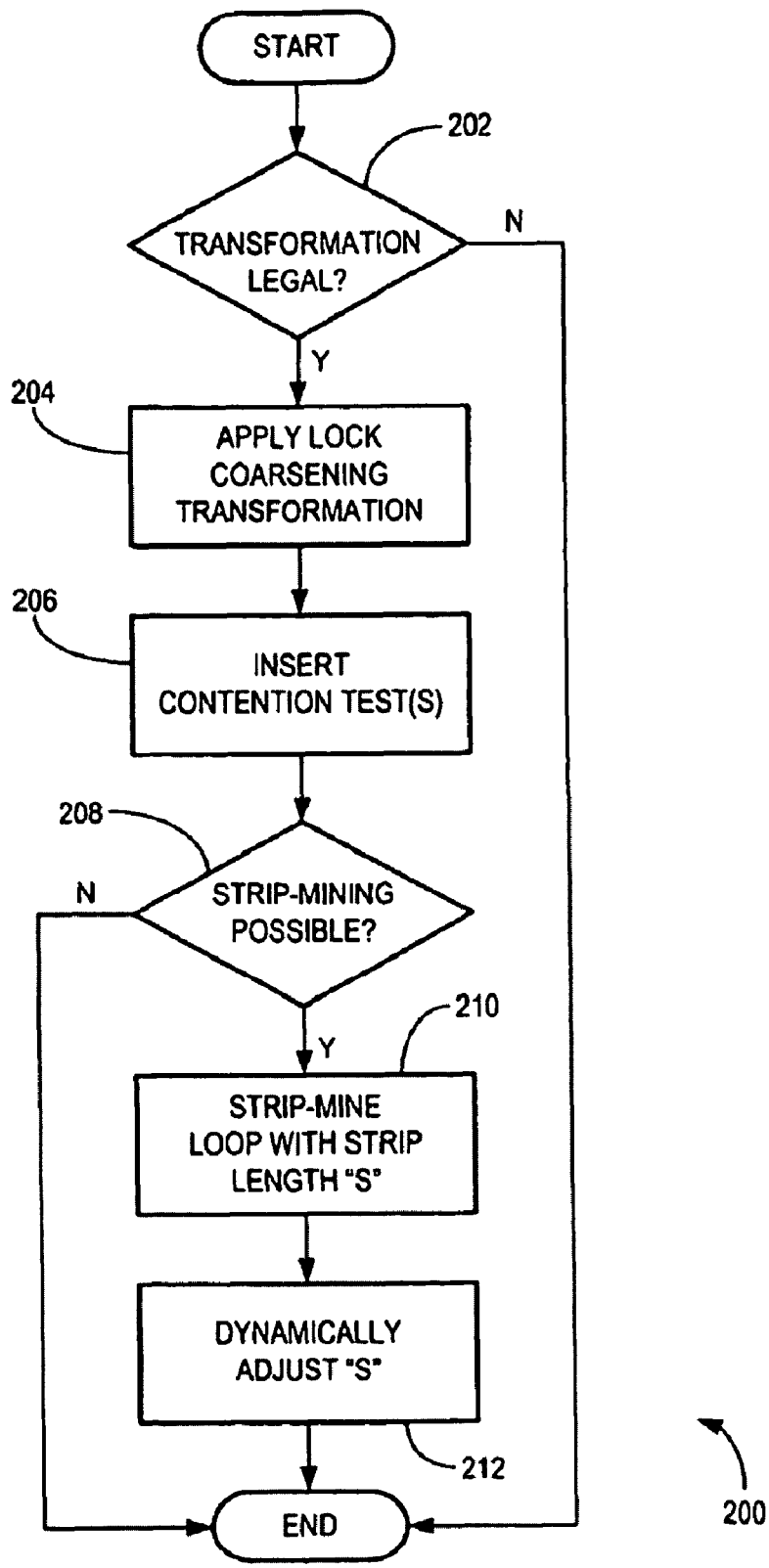
FIG. 2 is a schematic flow chart of a method for transforming locks in accordance with an exemplary embodiment.

FIG. 2 is a schematic flowchart of a method 200 for transforming locks in accordance with an exemplary embodiment of the invention. Method 200 is first described generally, then more specifically.

As shown, method 200 begins and first proceeds to decision block 202 at which method 200 determines whether a coarsening transformation of the subject lock is "legal". In an embodiment, this determination at block 202 may comprise a series of tests performed by examining and analyzing the subject software program code (e.g. software program 103 of FIG. 1). These tests are described in detail further below.

If a lock coarsening transformation is determined to be legal at decision block 202, method 200 then proceeds to block 204 where the lock coarsening transformation is applied to the subject software program code. If not, method 200 ends. An illustrative example of this coarsening transformation is provided further below with reference to FIG. 3 and FIG. 4.

Upon applying the lock coarsening transformation at block 204, a transformed version of the code is obtained. Method 200 then proceeds to block 206, at which one or more contention tests may be inserted into the transformed code. As will be explained, the contention tests ensure that a lock on an object is not held unduly when another thread in the same software program requires the locked object. An illustrative example is provided further below with reference to FIG. 5.

Method 200 then proceeds to block 208 at which method 200 determines whether it is possible to further transform the code into a strip-mine configuration. If so, method 200 proceeds to block 210 at which the code is transformed into a strip mine configuration with an inner loop having a strip-length S. If not, method 200 ends. An illustrative example of transformation to a strip-mine configuration is provided further below with reference to FIG. 6.

From block 200, method 200 finally proceeds to block 212 at which method 200 may further transform the code by adding the ability to dynamically adjust strip length S. Method 200 then ends. An illustrative example of code to dynamically adjust S is provided further below with reference to FIG. 7a and FIG. 7b.

A more specific description of the transformations in method 200 is now provided.

With reference to the determination at decision block 202 as to whether a lock coarsening transformation is legal, there are a variety of restrictions affecting when it is possible and correct to move a pair of lock and unlock operations from inside a loop. For example, a lock or unlock operation cannot be moved above or below certain types of software instructions because the semantics or correctness of the program might be altered.

Note that the lock-coarsening transformation may be affected by the programming language used. In the illustrative transformation examples provided further below, the "C" language is used, as it is widely understood. However, it is necessary to take care in adapting the transformations to other languages, such as Java, where there are memory coherence semantics associated with acquiring and releasing a lock. In such languages as Java, an instruction that locks or unlocks an object cannot simply be moved from one program location to another. Instead, the instruction must be divided into two parts; one which acquires or releases a lock, and another which accomplishes the memory coherence semantics. Only the first part of the instruction can be moved. Thus, in the present description, it will be appreciated that reference to "moving" of a lock or unlock operation applies to moving only the acquire or release aspect of the operation, and not the memory cohesion aspect of the operation.

Generally, before the above described coarsening transformation can be applied, it must first be established that the lock acquisition operation can be moved to before the loop, and that the lock release or unlock operation can be moved to after the loop. Thus, a primary restriction on whether the lock and unlock operations can be moved outside the loop is that the lock and unlock operations must apply to the same object for the entire duration of the loop. Accordingly, if a different object can be locked or unlocked on different iterations of the loop, then the coarsening transformation at block 204 cannot be applied. In this case, method 200 simply ends, as shown in FIG. 2.

If the same object is always locked and unlocked, then the software program code may be further examined above and below the original lock and unlock operations, respectively, for instructions that fall into one of the following four cases that prohibit moving the lock and unlock operations out of the loop:

(1) Call sites where it isn't known how long the call will take or whether it contains any other barriers to moving lock and unlock operations;
(2) Lock or unlock operations on other variables so that deadlock opportunities are created;
(3) Unresolved references, since resolution may take a long time and may cause a deadlock opportunity if the lock may be acquired in code executed to resolve the reference;
(4) References to volatile storage, because volatile storage can be used to implement locks and unlocks.

EXAMPLES

Illustrative examples of the transformations described above are now provided with reference to FIG. 3-FIG. 7b. As noted, the sample code in these illustrative examples is written in the common "C" computer language.

First consider the illustrative software program code 300 shown in FIG. 3. Here, a lock acquisition operation "lock (L)" at line 305 and a corresponding lock release operation "unlock (L)" at line 307 are contained within a software loop (i.e. lines 302-313). Keeping in mind the various restrictions on applying a coarsening transformation (as discussed above with respect to FIG. 2), it is clear that in this illustrative code 300 in FIG. 3 the lock acquisition and release is made on a single object "L" for the entire duration of the loop 302-313.

For the purposes of the present illustrative example, it is also assumed that the instructions above and below the original lock and unlock operations (lines 305 and 307) in code 300 do not fall into any one of the four previously enumerated cases which may prohibit moving the lock and unlock operations (lines 305 and 307) out of the loop 302-313.

Referring to FIG. 4, after determining that the transformation is legal (e.g. at decision block 202 of FIG. 2), a lock coarsening transformation may be applied to the code 300 of FIG. 3 by moving the "lock (L)" and "unlock (L)" operations (lines 305 and 307 of FIG. 3) outside of the loop 302-313. More specifically, as shown in code 400 in FIG. 4, at line 403, the "lock (L)" instruction has been moved in front of the loop 404-413. Also, as shown at line 415, the "unlock (L)" operation has been moved after the loop 404-413. An "if (L ! NULL)" test has been inserted at each of lines 402 and 414 to check that L is not a null value, before the "lock (L)" or "unlock (L)" operations are performed.

It will be apparent from this illustrative example that the "lock (L)" operation is now performed just once, before commencement of the loop 404-413, and the "unlock (L)" operation is performed just once, after completion of the loop 404-413. Thus, the lock has been coarsened in the sense that the number of times it is acquired and released has been substantially reduced.

Figure 5:
FIG. 5 is the code of FIG. 4 which further includes contention tests within the loop.

Now referring to FIG. 5, to ensure that the coarsened lock in code 400 of FIG. 4 is not held for a prohibitively long time, the code 400 may be further transformed by the insertion of a contention test in all paths of the loop 404-413 (FIG. 4). For example, as shown at line 507 in FIG. 5, a contention test "if (CONTENDED (L))" is inserted in the "if (condition)" path 507-510 of the loop 504-521. A corresponding contention test "if (L ! NULL && CONTENDED (L))" is inserted at line 516 in the "else" path 514-520 of the loop 504-521. It will be appreciated that, without these contention tests, coarsening the lock as shown in FIG. 4 may not necessarily result in a performance benefit.

The actual code sequence generated for the "CONTENDED (L)" operation in code 500 may depend upon the source language and runtime environment. In this illustrative example, note that the contention test is performed at the same point as the original "lock (L)" operation (i.e. line 305 in FIG. 3) so that if "L" is null at this time, an exception will be thrown at the same point as the original code 300 (FIG. 3) would have thrown an exception.

To further improve performance, in some cases, the code 500 shown in FIG. 5 may be transformed such that the loop can be strip-mined. Referring to FIG. 6, as shown, the loop 504-521 in code 500 (FIG. 5) has been transformed into a double loop, including an inner loop 607-616 and an outer loop 605-621. An initial value "int S<constant>" for the strip-length "S" is assigned at line 602. As will be apparent from code 600 in FIG. 6, the inner loop 607-616 executes for "S" iterations, and the outer loop executes a calculated number of iterations depending on the value of "S".

As shown in FIG. 6, a contention test "if (L ! NULL && CONTENDED (L))" at line 617 is placed outside of the inner loop 607-616, but inside of the outer loop 605-621. Consequently, the contention test is performed only after "S" iterations of the inner loop 607-616 are executed. Depending on the value of "S", it will be appreciated that the contention test at line 617 may be run less often or more often before the total number of iterations "N" are executed.

It will be appreciated that selection of an initial value for "S" may sometimes be difficult. Consequently, rather than assigning a constant value to "S" as shown in code 600, in an alternative embodiment, the value of "S" may be dynamically adjusted. An illustrative example is shown in FIG. 7*a*.

In FIG. 7*a*, the code 600 of FIG. 6 is shown partially transformed with a "SHRINK (S)" operation shown at line 721, and a corresponding "GROW (S)" operation shown at line 723. As will be apparent from an examination of code 700A, the "SHRINK (S)" operation is placed for execution if the contention test "if (L ! NULL && CONTENDED (L))" at line 718 is passed.

In this illustrative example, the strip length "S" is stored between invocations of "method_with_loop ( )" (line 701) in the "method_with_loop_S" variable (line 727) so that the code 700A does not have to repeatedly learn an appropriate value for "S".

The initial constant value stored in "method_with_loop_S" (line 702) depends on the expected likelihood of contention. For example, a reasonable initial choice for "S" might be any of 2-4 iterations, depending on the amount of code inside the inner loop 708-717. This range of "S" may provide a head start on reducing the number of contention checks, but the value of "S" can be quickly reduced, for example to 1, if the contention level is found to be high.

The "SHRINK (S)" and "GROW (S)" operations are expected to be short inlined code sequences that adjust the value of "S" to take into account the degree of contention experienced by the loop. Thus, the value of "S" may be shrunk after each instance of contention which indicates that other threads in the software program require access to the locked object. Correspondingly, the "GROW (S)" operation shown at line 723 is positioned to execute after each "S" iterations of the inner loop 708-717 In the present example, the value of "S" grows, unless there is an instance of contention which causes the value of "S" to shrink. Also, as will be noted, virtually any integer value of "S" may result since the code "mint strip_length min (N−i, S)" at line 707 accommodates any remainder after the total number of iterations "N" is notionally divided by "S".

Those skilled in the art will appreciate that the above is but one particular example of how the "SHRINK (S)" and "GROW (S)" operations may be performed, and that various other methods may be used.

For the example shown in FIG. 7*a*, some possible parameters for "SHRINK (S)" and "GROW (S)" are shown in FIG. 7*b*. For example, upon execution of the "SHRINK (S)" operation, the value of "S" may be incrementally decreased (by any selected integer value), immediately reset to 1, or reset in some other way in dependence upon the value of "S". Similarly, some possible alternatives for the "GROW (S)" operation may include incremental growth, or more rapid growth by a multiplicative value to a maximum value of "N" (i.e. the total number of iterations). As will be appreciated, different choices may trade-off an expected performance benefit (by reducing the number of contention checks) against the possibility of impeding another thread (by increasing the amount of time allowed to elapse before checking for contention). Which of the "SHRINK (S)" and "GROW (S)" alternatives are chosen for a particular case may be determined, for example, using heuristics or through feedback from various tests.

In the examples discussed above, there is only one lock within a software loop that is transformed. However, in certain cases, it may be possible to apply similar transformations even if there is more than one lock. Specifically, there are two cases when the transformation can be safely applied even if more than one lock is present inside the loop: 1) when the locks are nested in the original code, and 2) when every possible path taken inside the loop encounters only one lock pair.

In the first case of nested locks, consider the code 800 shown in FIG. 8. Here, substantially the same transformations described above in relation to FIG. 3 to FIG. 5 can be applied to the outermost lock-unlock pair (i.e. "lock (L1)" at line 805 and "unlock (L1)" at line 811). The result of the coarsening transformation is shown in code 900 in FIG. 9.

It will be appreciated that a similar coarsening transformation may also be applied to the "L2" lock (i.e. "lock (L2)" at line 912 and "unlock (L2)" at line 914) to generate code 1000 of FIG. 10.

As will be appreciated, in order to avoid a possible deadlock opportunity, care must be taken to release and then re-acquire the locks "L1" and "L2" in the proper order. This is illustrated in FIG. 10. Note that, again, contention tests for each of locks "L1" and "L2" are provided in each of the "if (condition)" path and the "else" path of the inner loop 1006-1037.

In the second case, if there are multiple locks present in a loop but only one of the locks is held in each iteration, and there is profile information indicating which of the locked paths is most frequently executed, that one particular lock can be favoured to be placed outside of the loop, with suitable compensation codes inserted in the other paths. That is, the profile information may be used to identify which lock, when moved outside the loop, is more likely to improve the loop's performance.

For example, consider code 1100 shown in FIG. 11. If a profiler has recorded, for example, that the "else" path in the code 1100 is the most frequently executed, then the transformations as described above may be applied, and the "lock (L2)" and "unlock (L2)" instructions may be moved outside of the loop 1101-1116. The transformed code 1200 is shown in FIG. 12 (for the sake of clarity, the strip-mine transformation has not been applied).

In this case, it will be appreciated that the "CONTENDED (L2)" check in the "then" path is not needed, since the compensation code will release that lock anyway. It will also be noted that the compensation code to release and re-acquire the "L2" lock in the "then" path is placed as late as possible and as early as possible, respectively, along the path where the "L1" lock is locked, so that the hardware can schedule as much of the code inside the less frequently accessed path as possible. In particular, "UnlockedCodeBefore ( )" and "UnlockedCodeAfter ( )" can be executed in parallel with the code outside the "then" path. Since the "lock (L1)" and "unlock (L1)" may act as barriers to scheduling in any case, it will be appreciated that the adjacent guarded code sections "unlock (L2)" and "lock (L1)", respectively, should not further impede the hardware's ability to schedule the code within the loop.

Alternatively, the transformation could also be done in the absence of such profile information. However, as will be appreciated, picking the wrong lock may have a negative impact on performance due to the extra "lock ( )" and "unlock ( )" operations executed on the most commonly accessed path. Thus, selection based on profile information is preferable.

While exemplary embodiments of the invention have been described, it will be appreciated that various changes and modifications may be made without departing from the scope of the invention.

Therefore, the scope of the invention is defined by the following claims.

We claim:

1. A system for transforming a lock on an executable object in a loop of a computer program, said lock having a pair of lock and unlock operations applicable on said executable object at original points within said loop, comprising:
   a processor;
   a non-transitory, computer readable memory; and
   logic, stored on the non-transitory, computer readable memory and executed on the processor, for:
   (a) moving said lock and unlock operations from said original points inside said loop to points outside said loop;
   (b) inserting a contention test within said loop for unlocking said lock if access to said object is required by another thread during execution of said loop; and
   (c) transforming said loop into an inner loop and an outer loop, said inner loop having a strip length size S and said outer loop having its number of iterations dependent upon S, said contention test in (b) being provided outside said inner loop but inside said outer loop;
   wherein in (b), said contention test is placed at the original point of said lock operation; and
   wherein said loop has N iterations.

2. The system of claim 1, the logic further comprising logic for: (d) dynamically adjusting S based upon a result of said contention test during execution of iterations of said outer loop.

3. The system of claim 2, wherein (d) comprises incrementally shrinking S where said contention test indicates contention.

4. The system of claim 2, wherein (d) comprises incrementally growing S where said contention test indicates lack of contention.

5. The system of claim 2, wherein (d) comprises resetting S to a predetermined minimum value where said contention test indicates contention.

6. The system of claim 2, wherein (d) comprises growing S by a multiplicative value, to a maximum value of N, where said contention test indicates lack of contention.

7. The system of claim 1, wherein in (b) said contention test is provided in two or more branches of a loop, such that said contention test is performed whenever one of the two or more branches is accessed.

8. A non-transitory, computer readable medium having computer readable program code embedded in the medium for transforming a lock on an object in a loop of a computer program, said lock having a pair of lock and unlock operations applicable on said object at original points within said loop, the non-transitory, computer readable program code including:
   (a) code for moving said lock and unlock operations from said original points inside said loop to points outside said loop;
   (b) code for inserting a contention test within said loop such that said lock is unlocked if access to said object is required by another thread during execution of said loop; and
   (c) code for transforming said loop into an inner loop and an outer loop, said inner loop having a strip length S and said outer loop having its number of iterations dependent upon S, said contention test in (b) being provided outside said inner loop but inside said outer loop;
   wherein in (b), said code is configured to insert said contention test at the original point of said lock operation; and
   wherein said loop has N iterations.

9. The computer readable medium of claim 8, further comprising: (d) code for dynamically adjusting S based upon a result of said contention test during execution of iterations of said outer loop.

10. The computer readable medium of claim 9, wherein (d) comprises code for incrementally shrinking S where said contention test indicates contention.

11. The computer readable medium of claim 9, wherein (d) comprises code for incrementally growing S where said contention test indicates lack of contention.

12. The computer readable medium of claim 9, wherein (d) comprises code for resetting S to a predetermined minimum value where said contention test indicates contention.

13. The computer readable medium of claim 9, wherein (d) comprises code for growing S by a multiplicative value, to a maximum value of N, where said contention test indicates lack of contention.

14. The computer readable medium of claim 8, wherein in (b) said code is configured to provide a contention test in two or more branches of a loop, such that said contention test is performed whenever one of the two or more branches is accessed.

* * * * *